Jan. 14, 1941. F. S. ORPEN ET AL 2,228,582
GATE
Filed April 27, 1940
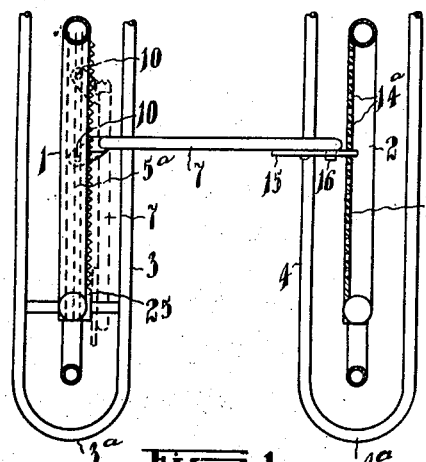
Fig. 1.
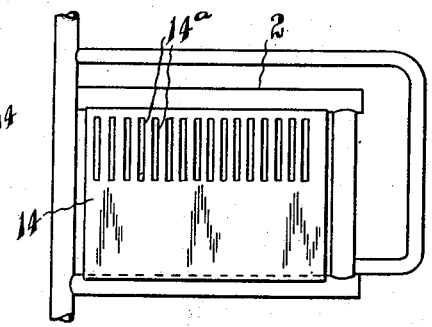
Fig. 4.
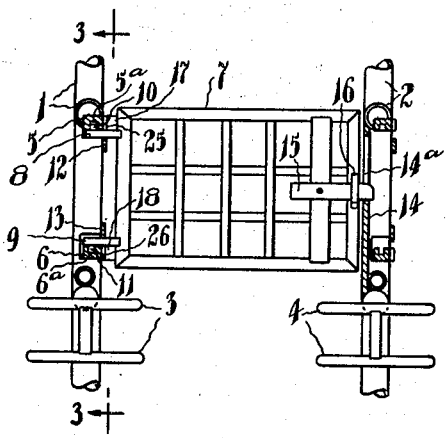
Fig. 2.
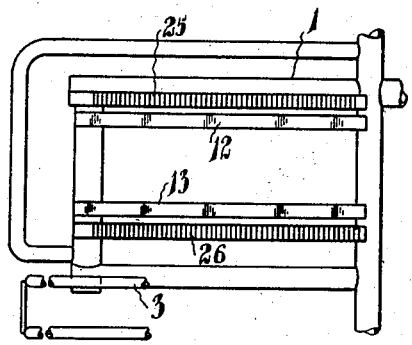
Fig. 3.
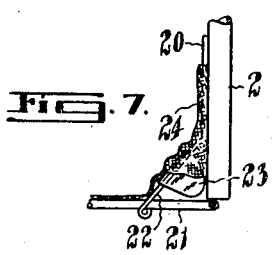
Fig. 7.
Fig. 5.
Fig. 6.
INVENTORS
F. S. Orpen
T. Clark
BY J. Edw. Maybee
ATTY Patented Jan. 14, 1941

2,228,582

UNITED STATES PATENT OFFICE 2,228,582

GATE

Fred S. Orpen and Thomas Clark, Toronto, Ontario, Canada, assignors to Long Branch Jockey Club, Limited, Toronto, Ontario, Canada Application April 27, 1940, Serial No. 331,960
In Canada April 11, 1940

11 Claims. (Cl. 119—15.5)

This invention relates to gates, and is particularly applicable to gates for stalls in starting apparatus for horse races, such as disclosed in Patent No. 2,211,457 of Marcus Ray Cowell entitled Starting apparatus for racing, issued August 13, 1940.

Starting apparatus for racing usually includes a plurality of adjacent stalls separated by partitions and having front and rear gates therefor. The front gate is closed and the horse is led or ridden into the stall through the rear thereof. When the horse is in the stall the rear end thereof is closed by means of a gate. If the rear gate is hinged at the rear of the stall, when the gate is swung out it projects beyond the rear of the stall and the horse on entering the stall is likely to strike the gate and damage itself. If the gate is swung right back it closes the entrance to the adjacent stall, so that no horse can enter the adjacent stall until the horse has entered the first stall and the rear gate is closed. It has been proposed to close the rear of the stall by means of a bar which is entirely removed from its mounting while the horse is entering the stall and is then placed in position and supported by the adjacent walls of the stall, but this is unsatisfactory, because it is awkward to handle and must be mounted on its supports from a position immediately behind the horse, making it dangerous for an assistant starter to perform his duty and causing loss of time in putting the horses in stalls. Moreover, such a bar to be used at all must be very light with the result that such bars are frequently kicked out of position by the horses or broken.

It is a well known fact that horses vary considerably in length. Not infrequently there would be a difference of fifteen inches in length between the longest and shortest horse in a race. The stalls or starting apparatus must be approximately the length of the horse in order to ensure equal starting, that is to say to make sure that the heads of all the horses are in alignment at the fronts of the various stalls. To ensure this, stalls have been provided with a series of supports for rear bars of the type described, so that the position of the rear bar may be adjusted backwards or forwards depending on the length of the horse. Although this adjustment of the length of the stall achieves the desired result, the use of such bars is open to the objections noted above.

The main object of this invention is to devise a rear gate for the stalls which is adjustable inwardly or outwardly of the stall to accommodate horses of different lengths, and which is not subject to the objections of previously known types of rear gates.

This invention further relates to the construction of the front gates of the stalls or starting apparatus. In the construction of front gate disclosed in the aforementioned patent of Marcus Ray Cowell the gates are held closed by means of a longitudinally movable bar and a link which is pivoted to the end of said movable bar and to the door and which extends across the corner between the wall of the stall and the door. With the construction just described there is a possibility of a horse catching its foot in the space between the link and the corner when the door is closed. The object of this further feature of this invention is to obviate the possibility of the horse catching its foot or hoof in the space just mentioned.

The objects of this invention are achieved by the constructions which are hereinafter more particularly described by way of illustration, and which are shown in the accompanying drawing in which:

Figure 1 is a horizontal section of the rear of one of the stalls of a race starting apparatus showing the rear gate in plan view;

Figure 2 a vertical section at the rear of one of the stalls showing the rear gate in elevation;

Figure 3 a side elevation of a portion of the rear end of a stall as viewed from inside the stall on the line 3—3 in Figure 2 and showing the supporting means for the gate, with the gate removed for the sake of clarity;

Figure 4 a side elevation of a portion of the rear end of a stall viewed from the inside showing the construction of the keeper for the latch of the gate;

Figure 5 a plan view on an enlarged scale, partly broken away of one side of the gate;

Figure 6 a side elevation of the view shown in Figure 5; and

Figure 7 a plan view partly broken away of the front corner of a stall.

Corresponding numbers in the different figures refer to corresponding parts.

The stall is shown as being formed of two partitions or walls 1 and 2 arranged in parallel spaced relationship and formed of a tubular metal framework, which in practice will be suitably padded. Spaced from each wall at a suitable height above the ground are guards 3 and 4 made of metal rods or tubes and extending beyond the rear end of the walls and curved at 3ª and 4ª and joined with corresponding guards on adjacent stalls. These guards serve to center the horses in the stalls and also protect the rear ends of the partitions 1 and 2 to prevent the horses from striking the same and injuring themselves. As illustrated in Figure 2 the guards 3 and 4 are preferably arranged in pairs one above the other. Although not so shown, the guards are suitably padded.

Secured to the wall 1 and adjacent the rear end thereof and running longitudinally thereof and horizontally are two bars 5 and 6 which are U-shaped in cross section forming longitudinal slots or grooves 5ª and 6ª, the slot 5ª facing downwardly and the groove 6ª facing upwardly.

The rear gate 7 has secured to and extending horizontally from one of its vertical sides lugs 8 and 9 having vertically projecting therefrom pins 10 and 11 respectively which are adapted to be received in the slots 5ª and 6ª respectively and which are slidable and rotatable therein. The pin 10 extends upwardly and the pin 11 extends downwardly into the said grooves. The lugs 8 and 9 lie in the horizontal plane of the gate, at an angle of a little less than 45° to the vertical plane of the gate. In other words if viewed from the front of the stall the lugs extend outwardly and rearwardly of the gate.

Supporting bars or strips 12 and 13, secured to the wall 1, extend below and above the lugs 8 and 9 respectively and are spaced from the bars 5 and 6 respectively a sufficient distance to permit the lugs 8 and 9 to pass between them.

It will be seen that a hinged construction has been provided for the gate which will permit it to swing relatively to the side wall 1 of the stall from a position at right angles to the side walls 1 and 2 to a position substantially parallel with the side wall 1 as shown in dotted lines in Figure 1. It will also be observed that the gate as a whole is slidable in the grooves 5ª and 6ª so that its position may be varied with respect to the end of the stall.

On the side wall 2 is mounted a keeper 14 (see Figure 4) having a plurality of slots 14ª therein adapted to receive the end of a latch 15 which is pivoted to the gate 7. A guide 16 is preferably provided on the side frame member of the gate 7. It will be seen that whatever the position of the gate, when it is closed there will be a slot 14ª at such a position that the gate may be locked in a position extending across the stall at approximately right angles to the walls 1 and 2.

Inasmuch as it is necessary that the gate be prevented from sliding backwards or forwards after it has been locked, particularly since a restive horse may kick the gate or back into it or make other efforts to get out of the stall, provision must be made for retaining the gate in the desired closed position. This has been accomplished by providing toothed racks 25 and 26 secured to the wall 1 and extending longitudinally thereof and horizontal, substantially parallel to the groove 5ª and 6ª respectively, and projections 17 and 18 respectively extending beyond the vertical edge of the gate 7 in the horizontal and vertical planes of said gate and adapted to engage the toothed racks 25 and 26 respectively when the gate is closed, that is when the gate is in a position substantially at right angles to the walls of the stall. The projections 17 and 18 are preferably toothed at their ends, forming a toothed segment, the teeth on the segment corresponding to the teeth on the rack so that they will mesh when the door is closed. The engagement of the projections 17 and 18 with the racks 25 and 26 respectively prevent longitudinal movement of the gate when in its closed position. The toothed racks 25 and 26 may be formed integrally with the bars 5 and 6 and the projections 17 and 18 may be formed integrally with the lugs 8 and 9 respectively.

It will be seen from the above description that the objects of this invention have been achieved, inasmuch as the gate 7 may be quickly and easily closed and locked in any desired position relative to the end of the stall. Preferably the bars 5 and 6 are approximately 2 feet long so that the position of the gate may be varied by that amount. It will also be observed that when the gate is open, as shown in Figure 1 in dotted lines, it lies close to the wall 1 and within the guard 3, and does not project beyond the wall and therefore there is no danger of damaging a horse which is entering the stall. The gate will, of course, be padded so that the slight projection from the wall 1 will not in any way endanger the horse. It will further be observed that the gate may be closed by the operator from the side of the stall without getting immediately behind the horse until the gate is closed, the interposition of the gate protecting the operator. After the horse has entered the stall, in closing the gate the operator grasps and pushes it inwardly or pulls it outwardly the desired distance, and then swings it to the closed position and locks it.

In Figure 7 is shown a fragment of the front corner of a stall in which 20 indicates the door operating bar which slides back and forth when the front door or gate 21 is closed and opened. Hinged to the operating bar 20 and to the door 21 is a link 22. Riveted or welded to the link 22 is a vertical piece or sheet 23 of metal, the part above the link 22 being resilient so that it may be bent inwardly into the corner between the wall 2 and the door 21 as illustrated. Secured in any suitable manner to the wall 2 and the door 21 is a strip 24 of canvas or other suitable covering material which extends across the corner between the side wall 2 and the door 21. The upper edge of the strip 24 is secured to the side wall and the door right up to the corner so that it pulls the resilient upper end of the sheet 23 inwardly towards the corner when the door is closed as illustrated in Figure 7. Where the material extends outwardly and passes around the link 22 it is loose or gathered, or may be elastic. It will be obvious that when the door swings outwardly to an open position in line with the side wall 2 the link 22 will lie substantially parallel with the door 21 and the material 24 will lie flat adjacent to and parallel to the door 21. The pressure of the material 24 on the resilient upper part of the sheet 23 will be relieved and the sheet 23 will straighten and also lie substantially parallel to the door.

It will therefore be seen that the construction described encloses the space between the link 22 and the side wall 2 and the door 21. It will be understood that there will be a door on the other side of the stall similarly equipped. Details of the construction of the front doors referred to may be obtained by reference to the Cowell patent previously mentioned.

It will be understood that various modifications of the invention may be possible without departing from the spirit thereof.

What we claim as our invention is:

1. The combination of spaced apart parallel walls; a horizontal bar secured to and extending longitudinally of one of the walls and having a longitudinal groove therein; a toothed rack adjacent and parallel to the groove; a gate, provided with a vertical pin at one side thereof slidably and pivotally mounted in the groove; and a projection on the side of the gate adjacent the pin adapted to engage the rack when the gate is swung to a closed position at substantially right angles to the walls and thereby prevent sliding of the pin in the groove.

2. The combination of spaced apart parallel walls; a horizontal bar secured to and extending longitudinally of one of the walls and having a longitudinal groove therein; a toothed rack adjacent and parallel to the slot; a gate, provided with a lug extending horizontally outwardly from one vertical side of the gate having a vertical pin extending at right angles thereto, said pin being slidably and pivotally mounted in the groove; and a projection on the side of the gate adjacent the pin, adapted to engage the rack when the gate is swung to a closed position at substantially right angles to the walls and thereby prevent sliding of the pin in the groove.

3. The combination of spaced apart parallel walls; a horizontal bar secured to and extending longitudinally of one of the walls and having a longitudinal groove therein; a toothed rack adjacent and parallel to the groove; a gate, provided with a vertical pin at one side thereof slidably and pivotally mounted in the groove; and a toothed segment on the side of the gate adjacent the pin adapted to engage the rack when the gate is swung to a closed position at substantially right angles to the walls and thereby prevent sliding of the pin in the groove.

4. The combination of spaced apart parallel walls; a horizontal bar secured to and extending longitudinally of one of the walls and having a longitudinal groove therein; a toothed rack adjacent and parallel to the groove; a gate, provided with a lug extending horizontally outwardly from one vertical side of the gate having a vertical pin extending at right angles thereto, said pin being slidably and pivotally mounted in the groove; a projection on the side of the gate adjacent the pin, adapted to engage the rack when the gate is swung to a closed position at substantially right angles to the walls and thereby prevent sliding of the pin in the groove; and a longitudinal support spaced from the grooved bar and engaging the lug to retain the pin in the groove.

5. The combination of spaced apart parallel walls; a horizontal bar secured to and extending longitudinally of one of the walls, said bar being U-shaped in cross section forming a longitudinal vertical groove therein; a toothed rack adjacent and parallel to the groove; a gate having a lug extending from one of the vertical sides thereof in the horizontal plane of the gate but at an angle to the vertical plane of the gate; a vertical pin in the end of the lug slidably and rotatably mounted in the groove; and a projection extending from the same vertical side of the gate in both the horizontal plane and vertical planes of the gate adapted to engage the rack when the gate is at substantially right angles to the walls and to be disengaged when the gate is rotated on the pin to a position substantially parallel to the walls.

6. The combination of spaced apart parallel walls; a horizontal bar secured to and extending longitudinally of one of the walls, said bar being U-shaped in cross section forming a longitudinal vertical groove therein; a toothed rack adjacent and parallel to the groove; a gate having a lug extending from one of the vertical sides thereof in the horizontal plane of the gate but at an angle to the vertical plane of the gate; a vertical pin in the end of the lug slidably and rotatably mounted in the groove; a projection extending from the same vertical side of the gate in both the horizontal plane and vertical planes of the gate adapted to engage the rack when the gate is at substantially right angles to the walls and to be disengaged when the gate is rotated on the pin to a position substantially parallel to the walls; and a longitudinal support spaced from the grooved bar and engaging the lug to retain the pin in the groove.

7. The combination of parallel walls; two horizontal bars secured to and extending longitudinally of one of the walls, said bars being in vertical spaced relationship to one another and having a longitudinal groove in each of said bars; a toothed rack adjacent and parallel to each slot; a gate having lugs etxending horizontally from one of the vertical sides thereof adjacent the upper and lower edges thereof, said lugs each having a vertical pin slidably and rotatably mounted in one of the grooves; and a horizontal projection on the side of the gate adjacent each of the lugs adapted to engage the rack when the gate is at substantially right angles to the walls and to be disengaged from the rack when the gate is swung to a position substantially parallel to the walls.

8. The combination of spaced apart parallel walls; a horizontal bar secured to and extending longitudinally of one of the walls and having a longitudinal groove therein; a toothed rack adjacent and parallel to the groove; a gate, provided with a vertical pin at one side thereof slidably and pivotally mounted in the groove; a projection on the side of the gate adjacent the pin adapted to engage the rack when the gate is swung to a closed position at substantially right angles to the walls and thereby prevent sliding of the pin in the groove; and means for retaining the gate in closed position.

9. The combination of spaced apart parallel walls; a horizontal bar secured to and extending longitudinally of one of the walls and having a longitudinal groove therein; a toothed rack adjacent and parallel to the slot; a gate, provided with a vertical pin at one side thereof slidably and piovtally mounted in the groove; a projection on the side of the gate adjacent the pin adapted to engage the rack when the gate is swung to a closed position at substantially right angles to the walls and thereby prevent sliding of the pin in the groove; and means for retaining the gate in closed position, said retaining means including a latch mounted on the gate and a keeper mounted on the wall opposite the wall in which the gate is hinged and having a plurality of apertures adapted to receive the latch in the various positions of the gate.

10. The combination of spaced apart parallel walls forming a stall; a gate hinged to a wall at one end thereof; means for retaining the gate in closed position including a bar slidably mounted on the wall, and a link hinged to the end of the bar and to the gate and extending across the inside corner of the gate and wall when the gate is closed, said link lying parallel to the gate when the gate is open; a vertical sheet secured to the link and extending above said link; and a piece of strong flexible material covering the link and sheet and secured to the wall of the stall and the gate, said material enclosing the corner between the wall and the gate when the gate is closed, and lying flat against the gate when the gate is opened.

11. The combination of spaced apart parallel walls forming a stall; a gate hinged to a wall at one end thereof; means for retaining the gate in closed position including a bar slidably mounted on the wall and a link hinged to the end of the bar and to the gate and extending across the inside corner of the gate and wall when the gate is closed, said link lying parallel to the gate when the gate is open; a vertical sheet secured to the link and extending above said link, the part of the sheet which extends above the link being resilient; and a piece of strong flexible material covering the link and sheet and secured to the wall of the stall and the gate, and bending the upper end of the sheet inwardly toward the wall and gate, said material enclosing the corner between the wall and the gate when the gate is closed, and lying flat against the gate when the gate is opened.

FRED S. ORPEN.
THOS. CLARK.